Figure 1:
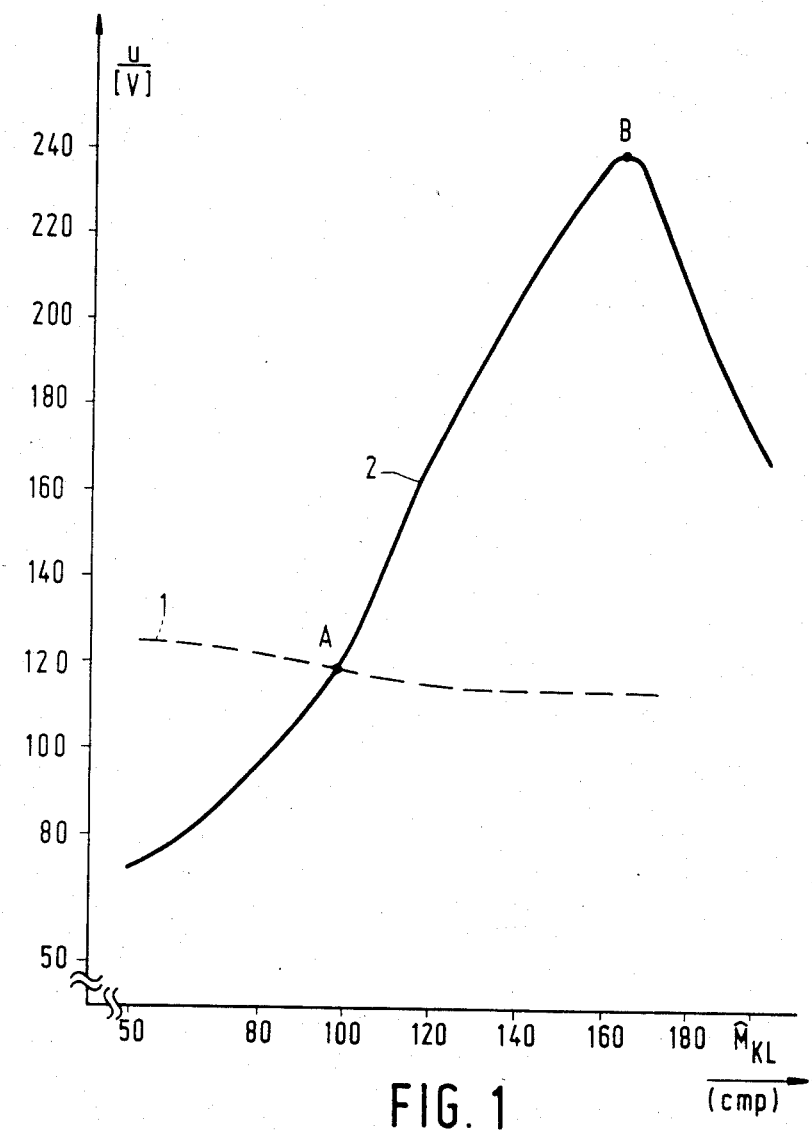

United States Patent [19]

Bertram et al.

[11] Patent Number: 4,636,676

[45] Date of Patent: Jan. 13, 1987

[54] SINGLE-PHASE SYNCHRONOUS MOTOR WITH TWO-POLE PERMANENT-MAGNET ROTOR

[75] Inventors: Leo Bertram, Stolberg; Gerhard Diefenbach, Aachen, both of Fed. Rep. of Germany; Hugo Schemmann, Schaesberg, Netherlands

[73] Assignee: U.S. Philips Corporation, New York, N.Y.

[21] Appl. No.: 693,703

[22] Filed: Jan. 22, 1985

[30] Foreign Application Priority Data

Jan. 30, 1984 [DE] Fed. Rep. of Germany ....... 3403041

[51] Int. Cl.$^4$ ............................................ H02K 21/08
[52] U.S. Cl. ..................................... 310/162; 310/41; 310/156
[58] Field of Search .................. 310/41, 81, 162, 163, 310/164, 156, 261

[56] References Cited

U.S. PATENT DOCUMENTS

| | | | |
|---|---|---|---|
| 3,041,513 | 6/1962 | Reiches | 310/41 |
| 3,433,987 | 3/1969 | Thees | 310/156 |
| 4,499,389 | 2/1985 | Hoche | 310/41 |
| 4,575,652 | 3/1986 | Gogue | 310/49 R |

OTHER PUBLICATIONS

Schemmann, H., "Zweipolige Einphasen-Synchronmotoren mit Dauermagnetischen Löufer Eigenschaften und Anwendung", *Feinwerktechnik und Messtechnik* 87(1979), pp. 163-169.

*Primary Examiner*—Patrick R. Salce
*Assistant Examiner*—D. L. Rebsch
*Attorney, Agent, or Firm*—Thomas A. Briody; Robert T. Mayer

[57] ABSTRACT

A single-phase synchronous motor with a two-pole permanent-magnet rotor of a magnet material having a remanence $B_r$, a specific density $\rho$, a rotor diameter d, a resulting detent torque of an amplitude $M_{k1}$, and a mass moment of inertia J. In the single-phase synchronous motor, high-energy magnet materials are used for the rotor, which rotor material is characterized by the constant $$C = \frac{B_r}{\sqrt{\rho}} \text{ larger than } 6.0 \frac{mT}{\sqrt{kg/m^3}}$$

The moment of inertia J and/or the detent torque $M_{k1}$ should be influenced in such a way that the natural frequency $$\omega_o = \sqrt{\frac{2 M_{k1}}{J}}$$

of the low-amplitude freely oscillating system comprising the rotor and the load is unequal to the mains frequency $\omega_e$. In the design of a single-phase synchronous motor this may result in, for example, the air gap at the narrowest point being enlarged in comparison with the dimensions of conventional motors having rotors with conventional permanent magnet materials.

11 Claims, 5 Drawing Figures (PRIOR ART)

SINGLE-PHASE SYNCHRONOUS MOTOR WITH TWO-POLE PERMANENT-MAGNET ROTOR

BACKGROUND OF THE INVENTION

The invention relates to a single-phase synchronous motor comprising a two-pole permanent-magnet rotor of a magnetic material having a remanence $B_r$, a specific density $\rho$, a rotor diameter d, a resulting detent torque of an amplitude $\hat{M}_{k1}$, and a mass moment of inertia J.

A single-phase synchronous motor of such a mechanical construction is known from the magazine "Feinwerktechnik und Messtechnik", 87 (1979/4, pages 163 to 169). Such motors are used for driving small domestic appliances such as citrus presses, can openers etc.

The problem of self-starting posed by these motors involves various aspects. Hereinafter, starting is to be understood to mean the transitional process which begins with the stationary condition of the motor and which ends with a condition characterized by a constant average angular velocity. This end condition may be a steady condition with periodic fluctuations of the instantaneous angular velocity, but there may also be low-frequency fluctuations which are superimposed on these periodic fluctuations. If, after application of the supply voltage, none of these conditions is reached, a motor will fail to start; that is, it will not be set into motion at all or its direction of rotation will change irregularly.

The starting voltage is defined as the lowest voltage of a voltage range above which the motor always starts without regard to the instant within the supply voltage cycle at which power is applied (hereinafter, the "switching-on instant"). This voltage range should be at least as wide as the required operating-voltage range. The load of the motor strongly influences the starting behavior, the starting voltage, and the width of the range.

Further, the starting behavior has static and dynamic aspects. With respect to the static aspects care must be taken, if necessary by the use of additional mechanical or other auxiliary circuits or devices, that the rotor cannot stall under the influence of friction torques or other loading torques in a position in which the instantaneous torque due to coil current, hereinafter referred to as the "current torque", which is a sinusoidal function of the rotor position, is zero. In the known motors this is generally achieved by an asymmetric shape of the stator-pole arcs. As a result of this asymmetry the magnetic reluctance torque of the rotor, also referred to as the detent torque, will not be zero in the position in which the current torque is zero. If the friction is not too high, this detent torque can rotate the rotor out of this positon, so that the current torque can provide the acceleration. In known models the angle of asymmetry is approximately 15° but it may also reach values of approximately 30°.

With respect to the dynamic aspects it was assumed previously (ETZ A 87, March 1966, pages 171–175) that starting proceeded as a torsional vibration of increasing amplitude. Starting was then assumed to take place above an amplitude value of 180°.

Subsequently, the opinion was held that the detent torque impairs the starting process and it would be preferred, for example by dividing the rotor into two or more parts, to reduce or even completely eliminate this torque (DE-PS No. 14 88 267 corresponding to U.S. Pat. No. 3,433,987, "Der Elektromeister", Heft 1, 1965).

Later it was found that "a specific, not too small, detent torque is necessary because otherwise the coil field has to be made too large to meet other requirements" (ETZ A 87, March 1966).

Investigations on synchronous motors, which are now manufactured in large production runs for use in small domestic appliances, have shown that starting actually proceeds as a jump from the stationary condition to the synchronous speed. Generally, this jump takes a time of approximately 6 msecs. This imposes requirements on the motor dimensioning which manifest themselves in the starting-time constant. Suitably, this starting-time constant lies in the range of approximately 2–6 msecs. The following requirement is valid:

$$\tau = \frac{\frac{1}{2}\omega_e^2 \cdot J}{\frac{U}{Z} \cdot E} \approx 2\text{--}6 \text{ msecs.}$$

Here:
  $\omega_e$ is the angular supply voltage frequency
  J is the mass moment of inertia of motor and load
  U is the supply voltage
  E is the induced voltage
  Z is the coil impedance.

The detent torque is not involved in the concept of the starting-time constant. In deriving this starting requirement it has been assumed that after the voltage has been switched on, with a more or less irregular motion the rotor can reach a position in which the rotor magnetization extends substantially perpendicularly to the coil field and from which position this jump can be made.

This has always been the case with the known motors. If the starting-time constant becomes too small, for example if the voltage is too high, the rotor will perform very irregular motions accompanied by reversal of the direction. If the starting-time constant is too large, for example if the mass moment of inertia is too large, the rotor will not be set into motion and if mass moment of inertia is very large the rotor will merely vibrate.

If in known motors the voltage is increased starting from zero, the motor will initially perform vibrations of small amplitude. This amplitude then increases but generally does not exceed 20° to 30°.

When the voltage is increased further this vibration rhythm of the known motors generally changes into a more or less regular rotation with or without direction reversal. The voltage at which this happens can be calculated to a close approximation, using the value of the starting-time constant. Hereinafter, this voltage is referred to as the breakaway voltage. Generally, the breakaway voltage increases when the inertial mass is increased, for example, by means of a load.

The starting voltage as defined above may be higher than the breakaway voltage depending on the stability requirements imposed on the rotor motion. Although instantaneously the synchronous angular velocity is exceeded, the motor cannot sustain a rotation in a specific direction and with constant average angular velocity. All single-phase synchronous motors known to date exhibit such a behavior.

For the miniaturization of these motors and appliances, it is obvious to use high-energy magnet materials. When RES-Magnets (Rare Earth Sintered magnets) are used, instead of barium-ferrite or strontium-ferrite magnets, the remanance may be increased for example from approximately 350 mT (3500 G) to over 790 mT. The specific density then increases from approximately 4.8 to 8.2 g/cm³. This step has a favorable effect on the starting-time constant, resulting in a reduction of this constant when the rotor dimensions remain the same. Reducing the rotor diameter has a similar effect. It also results in a reduced starting-time constant.

Nevertheless it is found with motors using high-energy magnet materials that, for specific initial values of the applied supply voltage, related to specific switching-on instants, the breakaway voltage is substantially higher than expected in view of the above considerations with regard to the starting-time constant.

There are several instantaneous voltage values at the switching-on instant which lead to a normal starting process as described above. However, at other switching-on instants the rotor will be locked in a condition in which it oscillates about the stationary position; these oscillations are referred to hereinafter as boundary oscillations. Only when the voltage is substantially higher than anticipated based on the starting-time constant, can the rotor break away from this condition of oscillation.

The occurrence of these boundary oscillations far above the voltage determined by the starting-time constant is new for the single-phase synchronous motors described here.

SUMMARY OF THE INVENTION

It is the object of the invention to preclude these boundary oscillations in new motor designs employing high-energy magnet materials, in order to minimize the starting voltage or to minimize the dimensions of the motor for a specific power rating.

According to the invention, rotors using a high-energy magnet material having a characteristic constant $$C = \frac{B_r}{\sqrt{\rho}} \text{ larger than } 6.0 \frac{mT}{\sqrt{kg/m^3}}$$

are designed so that the moment of inertia $J$ and/or the detent torque $\hat{M}_{k1}$ have values such that a natural frequency $$\omega_o = \sqrt{\frac{2\hat{M}_{k1}}{J}}$$

of the low-amplitude freely-oscillating system comprising the rotor and the load is unequal to the angular supply voltage frequency $\omega_e$.

This precludes boundary oscillations and minimizes the starting voltage. The adverse effect of the boundary oscillations on the starting process of the motor is found to have disappeared if the natural frequency $\omega_o$ of the system is spaced far enough from the angular supply voltage frequency $\omega_e$.

A motor for a supply frequency of 50 Hz described in "Feinwerktechnik" 4/79 (pages 163–169) has, for example, a mass moment of inertia of 5.36·10⁻⁷ Nmsec² and a detent-torque amplitude of 145·10⁻⁴ Nm. From this a natural frequency $\omega_o$ of $2\pi \cdot 37$/sec can be calculated. This value can be reduced even further by adding further moments of inertia.

A different situation occurs when high-energy magnet materials are used. In that case not only the flux increases but the detent force increases even more strongly. This force is a substantially quadratic function of the field strength if, for the remainder of the motor, the design is the same. Thus, it increases strongly. As the specific density does not increase to the same extent, the use of improved magnet materials generally leads to an increase of the natural frequency of the rotor.

The use of RES 160 magnet material with a $B_r$ of 790 mT and a density of 8.2 g/cm³ yields for example a natural frequency $\omega_o$ of $2\pi \cdot 64$/sec. If the motor is then loaded with an additional moment of inertia this frequency will soon come close to the supply voltage frequency.

One possibility of influencing the natural frequencies is the use of additional moments of inertia. In particular in the case of miniaturization this may give rise to the problems with respect to the geometry. In addition, the starting-time constant increases and the starting voltage increases accordingly. However, in individual cases this method may be successful. A prerequisite for the use of the various methods is that the influence of the natural frequency, the moment of inertia, and the detent torque is known and the dimensioning is effected in such a way that resonance is avoided deliberately.

If new motors, with higher remanence values compared to known motors and the prior art, are dimensioned in the customary way, attention being paid primarily to the starting-time constant, and the air gap further being dimensioned mainly in accordance with principles of production engineering, the natural frequency of the rotor is bound to come within a range in which boundary oscillations occur. This result leads to a higher starting voltage.

However, the dimensioning should be based not only on the natural frequency of the motor but on the entire system. The desired spacing from the supply voltage frequency can also be obtained by means of additional inert masses in the load. In general, it is advantageous to apply this dimensioning rule to all single-phase synchronous motors with permanent-magnet rotors. However, this rule is of particular importance in the case of rotors made of a high-energy magnet material.

In a further embodiment of the invention the natural frequency $\omega_o$ is higher than 1.1 to $1.2\omega_e$ or smaller than 0.9 to $0.8\omega_e$. This natural frequency is then spaced so far from the resonant frequency that the boundary oscillations have hardly any adverse effect.

Thus, the starting voltage is reduced to an extent which is permissible in view of starting-time constant and the motional stability. Moreover, in this way it is possible to miniaturize a motor for the specific use in such a way that the required starting voltage is obtained, while at the same time the above secondary requirements are met. A simple possibility of influencing the situation is to reduce or to widen the air gap.

This enables the dimensions of the motor and the required amount of material to be minimized. This also leads to the most economic motor.

If the detent torque should be minimal in view of static starting conditions, the starting voltage can be improved by influencing the moment of inertia within certain limits. If the moment of inertia can be reduced, it may be attempted to reach the above-resonance range by reducing the rotor diameter and the air gap.

If the moment of inertia cannot be reduced, it should be attempted to reach the sub-resonance range by means of additional moments of inertia. In principle this leads to an increase of the starting-time constant and an increase in starting voltage in comparison with the value in the case of small moments of inertia in the non-resonance case (i.e. in the case of small detent torques).

In accordance with a further embodiment of the invention, a simple method of reducing the natural frequency without significantly influencing any further motor parameter is to enlarge the air gap with a consequent reduction of the detent torque, in such a way that the natural frequency $\omega_o$ becomes lower than 0.9 to $0.8\omega_e$. Through the quadratic relationship with the rotor flux this also influences the stray flux which affects the detent torque. In known motors the air gap varies from 0.3 to 0.65 mm at the narrowest location and 0.95 to 1.5 mm at the widest location. In accordance with the invention the air gap is larger than 0.65 mm at the narrowest location.

If in the case of a new design with an RES rotor the same rotor diameter and similar air gap geometries are used, for example 0.3 mm at the narrowest location and 1.5 mm at the widest location of the air gap, a detent torque amplitude of, for example, 145 cmgf is obtained for a specific rotor length. By widening the air gap at the narrowest location by 0.6 mm a detent torque is reduced to 85 cmgf in the case of an air gap of 1.5 mm at the widest location. This air gap is substantially wider than customary. When allowance is made for the use of an additional drive mechanism with a mass moment of inertia of $10^{-7}$ Nms$^2$ a rotor moment of inertia of approximately $2 \cdot 10^{-7}$ Nmsec$^2$ yields a reduction of the natural frequency $\omega_o$ from approximately $49 \cdot 2\pi$/sec to $37.5 \cdot 2\pi$/sec. This results in a gain of approximately 100 V for the starting voltage. By means of this step a useless drive mechanism is turned into a useful construction.

In a further embodiment of the invention the magnet material is magnetized in such a way that the natural frequency $\omega_o$ is lower than 0.9 to $0.8\omega_e$. In accordance with a further embodiment of the invention this is also possible by means of a suitable magnetization distribution. This can be achieved in that the rotor is not fully magnetized or in that a larger radial component occurs within the magnetization distribution.

In a further embodiment of the invention the air gap is reduced in such a way that the natural frequency $\omega_o$ is higher than 1.1 to $1.2\omega_e$. The resulting increase in detent force enables the motor to be started even in the case of larger friction torques.

In a further embodiment of the invention the natural frequency is increased or reduced by means of additional magnetic or mechanical moments. Such moments can be obtained by the use of additional elements such as springs or auxiliary magnets which contribute to or reduce the detent torque in such a way that natural frequency $\omega_o$ does not coincide with the angular supply voltage frequency.

In a further embodiment of the invention the bore of the rotor sleeve is enlarged. This reduces the detent torque and shifts the natural frequency towards a range below 0.9 to $0.8\omega_e$.

In a further embodiment of the invention the degree of saturation of the stator iron is varied. In this way it is possible to influence the detent torque in such a way that the natural frequency $\omega_o$ becomes higher than 1.1 to $1.2\omega_e$ or smaller than 0.9 to $0.8\omega_e$.

Figure 2:
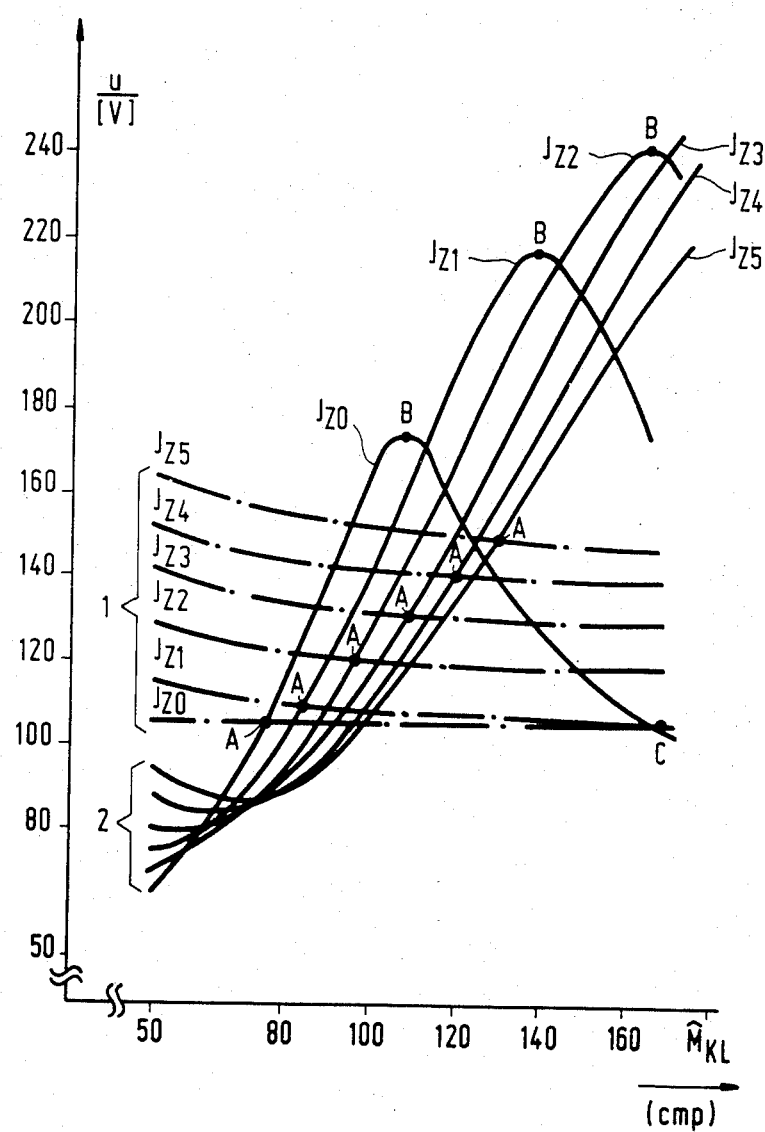
Figure 3:
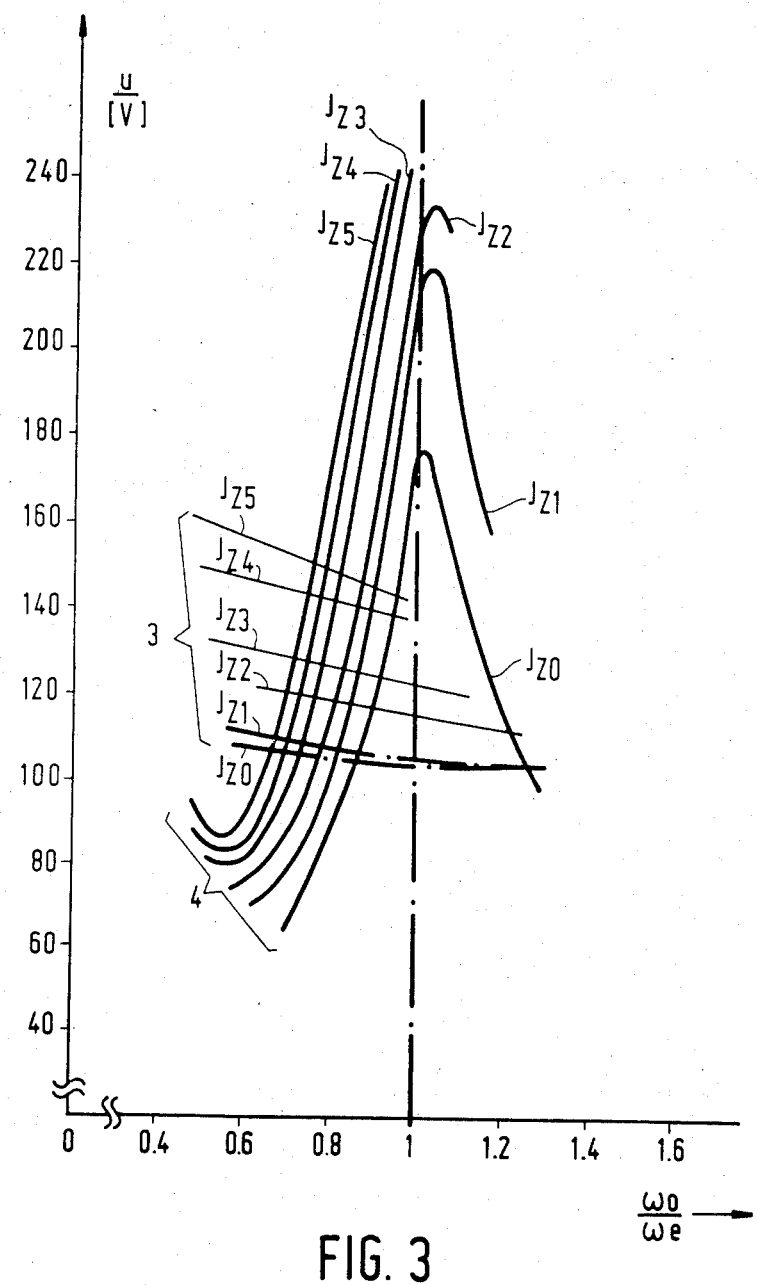
Figure 4A:
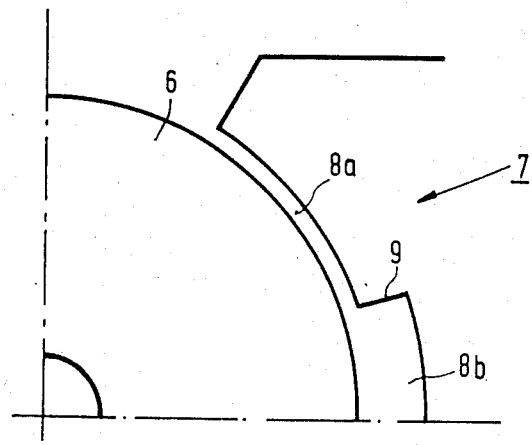
Figure 4B:
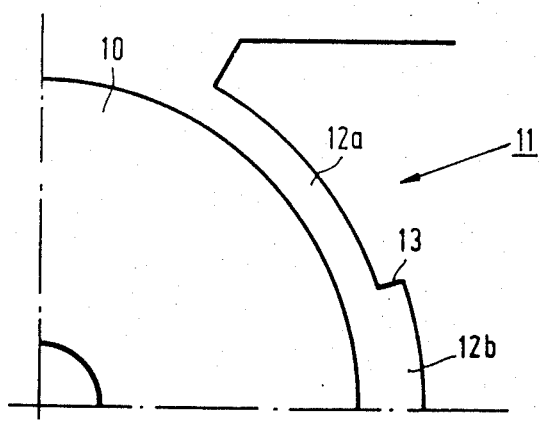

The invention will now be described in more detail, by way of example, with reference to the drawings, in which:

FIG. 1 is a diagram illustrating the influence of detent torques on the starting behavior of a single-phase synchronous motor, FIG. 2 illustrates the influence of additional mass moments of inertia in combination with a variation of the detent torque on the starting behavior of the motor, FIG. 3 represents the dependence of the starting voltage on the natural frequency of the motor-load system and on the ratio between the natural frequency and the supply voltage frequency, and FIGS. 4a and 4b are sectional views of the pole area of a single-phase synchronous motor, showing the shape of the polepieces and the air gap geometry.

The diagram in FIG. 1 illustrates the starting behavior as a function of the detent-torque amplitude for a single-phase synchronous motor with RES permanent-magnet rotor, the magnet material having a remanence of approximately 800 mT. The line 1 represents the comparatively low voltage at which the motor starts in most cases and which depends only slightly on the detent torque. The line 1 corresponds to the normal theories on the starting behavior of the motor. The line 2 represents the voltage up to which oscillations occur which impair starting of the motor. Up to point A, the voltages corresponding to the line 2, at which oscillations cannot occur, are situated below the voltages represented by the line 1. In this range the line 1 represents the actual starting voltage. However, in the case of detent-torque values which are larger than these, corresponding to point A, the oscillations may occur partly at substantially higher voltages at specific switching-on instants of the voltage. The effective starting voltage is substantially higher than the voltage represented by the line 1.

As the detent-torque amplitude increases, the starting voltage initially increases strongly above point A. After a maximum voltage at point B has been exceeded, it decreases significantly as the detent-torque amplitude increases further.

As a result of these oscillations, reliable starting of the motor is ensured only at voltages which are substantially higher than the theoretically attainable values.

The diagram of FIG. 2 represents the same situation as in FIG. 1 in the case that the overall mass moment of inertia is varied. The lines 2 represent the situation for different moments of inertia $J_{Z0}-J_{Z5}$ and, in the same way as described for FIG. 1, they give the voltage up to which oscillations can occur.

The lines 1 represent the voltages for which the motor can start instantly, depending on the mass moment of inertia $J_{Z0}-J_{Z5}$ at specific switching-on instants of the voltage. The lines 1 and 2 intersect again in the points A. For small mass moments of inertia the lines 2 bend in the points B. This means that, as the detent torque increases, the limit voltages for which oscillations can occur also increase initially. Upon passage of the detent torque corresponding to point B they decrease again. For large moments of inertia point B will be situated outside the range of interest. The most favorable situation with respect to the starting behavior is obtained if small moments of inertia are required and the detent torque is dimensioned as indicated by point A. Another possibility is the dimensioning in conformity with point C for large values of the detent torque. Point C is the point of intersection of the lines 1 and 2 for large values of the detent torque.

FIG. 3 shows curves representing the motor voltages depending on the ratio of the natural frequency of the motor-load system and the supply voltage frequency for different values of the moment of inertia. The lines 3 represent the voltages for which the motor is capable of starting for various moments of inertia $J_{Z0}$–$J_{Z5}$ depending on the frequency ratio at specific switching-on instants of the voltage. Similarly, the lines 4 relate to voltages up to which oscillations may occur which inhibit starting of the motor.

If the natural frequency of the motor-load system is situated near the supply voltage frequency, the voltages at which oscillations can occur are substantially higher than expected normally. This range is therefore very unfavorable and is avoided in that the detent torque and the mass moment of inertia are dimensioned in such a way that the resulting natural frequency is higher or smaller than the supply voltage frequency. Preferably, the natural frequency has values of 0.8 to 0.9$\omega_e$ or 1.1 to 1.2$\omega_e$. Generally, this ratio between natural frequency and the supply voltage frequency should be such that the lines 4 are situated below the corresponding lines 3. In the case of large moments of inertia, for which the lines 4 exhibit no maximum in the range of interest, the natural frequency can have only values lower than the supply voltage frequency.

The sectional view in FIG. 4a shows a part of the rotor 6 of a single-phase synchronous motor in which the magnet material of the rotor 6 is, for example, barium ferrite or strontium ferrite. Between a pole 7 and the rotor 6 an air gap 8 is formed which has a narrow portion 8a and a wider portion 8b. Between the narrow and the wide portion a step 9 may be formed; however, the transition may also be smooth. Customary values for the narrow range 8a are 0.3 to 0.65 mm and for the wide range 8b these values are approximately 0.95 to 1.5 mm.

The sectional view in FIG. 4b shows a part of a single-phase synchronous motor whose rotor 10 is made of a rare-earth magnet material. Between the pole 11 and the rotor 10 an air gap 12 is formed which has a narrow portion 12a and a wide portion 12b. Again a step 13 may be formed between the narrow portion and the wide portion. In the present example the narrow portion 12a may have a width larger than 0.65 mm, for example 0.9 mm.

What is claimed is:

1. A single-phase synchronous motor comprising a two-pole permanent-magnet rotor of a high energy magnetic material having a remanence $B_r$, a specific density $\rho$, a rotor diameter d, a resulting detent torque of an amplitude $\hat{M}_{k1}$, and a mass moment of inertia J; said rotor having a characteristic constant of $$C = \frac{B_r}{\sqrt{\rho}}, \text{ where } C \text{ is greater thn } 6.0 \frac{mT}{\sqrt{Kg/m^3}};$$

a natural frequency $\omega_o$,
where $$\omega_o = \sqrt{\frac{2\hat{M}_{k1}}{J}};$$

and a supply voltage frequency $\omega_e$; such that in a low-amplitude freely oscillating system comprising said rotor and a load, the improvement therein comprising determining the values for said amplitude of said detent torque $M_{k1}$ and mass moment of inertia J of said synchronous motor so that said natural frequency $\omega_o$ is unequal to said voltage supply frequency $\omega_e$ to limit the value of voltages at which oscillations of said rotor can occur which prevents the starting of said motor.

2. A single-phase synchronous motor as claimed in claim 1, wherein said natural frequency $\omega_o$ is within the range 1.1$\omega_e$ to 1.2$\omega_e$ or 0.9$\omega_e$ to 0.8$\omega_e$.

3. A single-phase synchronous motor as claimed in claim 1, wherein an air gap between a pole of a stator and said rotor is determined so that said natural frequency $\omega_o$ is within the range of 0.9$\omega_e$ to 0.8$\omega_e$, or 1.1$\omega_e$ to 1.2$\omega_e$.

4. A single-phase synchronous motor as claimed in claim 3, wherein said air gap is greater than 0.65 mm, preferably 0.9 mm, at its narrowest location between said pole of said stator and said rotor.

5. A single-phase synchronous motor as claimed in claim 1, wherein said rotor comprises magnetized material which determines said natural frequency $\omega_o$ to be within the range of 0.9$\omega_e$ to 0.8$\omega_e$.

6. A single-phase synchronous motor as claimed in claim 1, wherein said rotor has a magnetic distribution so that said natural frequency $\omega_o$ is within the range of 0.8$\omega_e$ to 0.9$\omega_e$ or 1.1$\omega_e$ to 1.2$\omega_e$.

7. A single-phase synchronous motor as claimed in claim 1, wherein said diameter d of said bore of said rotor sleeve is determined so that said natural frequency $\omega_o$ is within the range of 0.8$\omega_e$ to 0.9$\omega_e$, or 1.1$\omega_e$ to 1.2$\omega_e$.

8. A single-phase synchronous motor as claimed in claim 2, wherein an air gap is determined so that said natural frequence $\omega_o$ is within the range of 0.9$\omega_e$ to 0.8$\omega_e$ or 1.1$\omega_e$ to 1.2$\omega_e$.

9. A single-phase synchronous motor as claimed in claim 2, wherein said rotor comprises magnetized material which determines said natural frequency $\omega_o$ to be within the range of 0.9$\omega_e$ to 0.8$\omega_e$ or 1.1$\omega_e$ to 1.2$\omega_e$.

10. A single-phase synchronous motor as claimed in claim 2, wherein said rotor has a magnetic distribution so that said natural frequency $\omega_o$ is within the range of 0.8$\omega_e$ to 0.9$\omega_e$ or 1.1$\omega_e$ to 1.2$\omega_e$.

11. A single-phase synchronous motor as claimed in claim 2, wherein an air gap is determined so that said natural frequency $\omega_o$ is within the range of 1.1$\omega_e$ to 1.2$\omega_e$ or 0.8$\omega_e$ to 0.9$\omega_e$.

* * * * *